United States Patent [19]

Lim

[11] E Re. 29,336

[45] Reissued Aug. 2, 1977

[54] METHOD OF ETCHING A SURFACE OF A SUBSTRATE COMPRISING $LiTaO_3$ AND CHEMICALLY SIMILAR MATERIALS

[75] Inventor: Mahn-Jick Lim, Lower Makefield Township, Bucks County, Pa.

[73] Assignee: Western Electric Company, Inc., New York, N.Y.

[21] Appl. No.: 751,926

[22] Filed: Dec. 17, 1976

Related U.S. Patent Documents

Reissue of:

[64] Patent No.: 3,860,467
Issued: Jan. 14, 1975
Appl. No.: 445,039
Filed: Feb. 22, 1974

[51] Int. Cl.[2] ..... H01L 21/306

[52] U.S. Cl. ..... 156/626; 156/903; 252/79.3

[58] Field of Search ..... 156/625, 626, 662, 663, 156/667, 903; 65/31; 252/79.3

[56] References Cited

U.S. PATENT DOCUMENTS

| | | | |
|---|---|---|---|
| 1,777,321 | 10/1930 | Meth | 252/79.3 |
| 2,847,287 | 8/1958 | Landgren | 156/662 X |
| 3,546,037 | 12/1970 | Salzle | 156/663 X |

OTHER PUBLICATIONS

Applied Physics Letters, vol. 6, No. 11, 6-1-1965, by K. Nassau et al., pp. 228 and 229, (Etching of $LiNbO_3$).

Journal of Applied Physics, Domain Structure and Curie Temperature of Single-Crystal Lithium Tantalate by H. J. Levinstein et al., 6-22-1966, pp. 4585 and 4586.

*Primary Examiner*—William A. Powell
*Attorney, Agent, or Firm*—J. Rosenstock

[57] ABSTRACT

A method of etching a surface of a substrate comprising lithium tantalate ($LiTaO_3$) and chemically similar materials is disclosed. The method includes contacting the surface with a mixture comprising hydrofluoric acid and sulfuric acid. In addition to its etching action, the mixture is also capable of polishing the thus treated surface.

7 Claims, No Drawings

METHOD OF ETCHING A SURFACE OF A SUBSTRATE COMPRISING $LiTaO_3$ AND CHEMICALLY SIMILAR MATERIALS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method of etching a surface of a substrate comprising $LiTaO_3$ and chemically similar materials and more particularly, to a method of etching $LiTaO_3$ with a mixture comprising hydrofluoric acid and sulfuric acid.

2. Description of the Prior Art

Recently, lithium tantalate ($LiTaO_3$) has become of great interest in the electrical device industry. An inherent problem in the use of $LiTaO_3$ has been the etching and polishing of this material. Lithium tantalate ($LiTaO_3$) can be etched with an aqueous mixture consisting of $HNO_3$ and HF. However, the etching can only be carried out at a reasonable rate at the boiling temperature of the mixture. With respect to the polishing of $LiTaO_3$, the $HNO_3$-HF mixture does not polish a surface of $LiTAO_3$ so that optical inspection thereof for surface and interior defects is possible. An etchant which both etches the $LiTaO_3$ and polishes a surface thereof at a reasonable rate at a moderate temperature is therefore desirable and a method of employing such an etchant is an object of this invention.

SUMMARY OF THE INVENTION

The present invention is directed to a method of etching a surface of a substrate comprising $LiTaO_3$ and chemically similar materials and more particularly, to a method of etching $LiTaO_3$ with a mixture comprising hydrofluoric acid and sulfuric acid.

Briefly, the method comprises contacting a surface of a substrate, comprising lithium tantalate ($LiTaO_3$) with a mixture comprising hydrofluoric acid and sulfuric acid whereby etching thereof occurs. Additionally, the mixture has a polishing effect on the etched surface.

DETAILED DESCRIPTION

The present invention is based upon the discovery of a unique chemical system for etching lithium tantalate and chemically similar compounds such as lithium niobate ($LiNbO_3$) and barium titanate.

The etching system comprises a mixture comprising hydrofluoric acid, HF and sulfuric acid, $H_2SO_4$, contained in at least one suitable liquid solvent carrier. The solvent carrier may be either an aqueous or nonaqueous liquid. A preferred carrier solvent is water.

The concentrations of the respective components, HF and $H_2SO_4$, employed depend on the rate of etch desired at a particular temperature. In this regard, it is to be noted that a preferred mixture concentration for 49 weight percent aqueous HF and 97 weight percent aqueous $H_2SO_4$ typically ranges from about 0.40 to about 0.90 volume fraction of 49 weight percent aqueous HF (about 42.172 moles of HF/1000 gms. $H_2O$, 40.173 moles of $H_2SO_4$/1000 gms. $H_2O$ to about 47.535 moles/1000 gms. $H_2O$ and 3.354 moles/1000 gms. $H_2O$, respectively).

A substrate to be treated, i.e., comprising $LiTaO_3$, is immersed in or exposed in some conventional manner to the etching solution mixture wherein the $LiTaO_3$ is etched. The temperature of the etching solution is maintained at a temperature between room temperature to the boiling point of the particular mixture employed. In this regard, the temperature selected depends upon the parameters such as the etching mixture employed and the etch rate desired. After the substrate has been immersed in the etching solution mixture for the requisite period of time, it is removed therefrom and rinsed with a suitable solvent, e.g., water, and then dried. It is to be noted that exposure to the HF-$H_2SO_4$ mixture leads to polishing of the $LiTaO_3$ substrate surfaces. It is also to be noted that exposure of $LiTaO_3$ to 100 percent of 97 weight percent aqueous $H_2SO_4$ does not lead to etching thereof (within experimental error) at 90° C even after 40 hours of exposure thereto.

Specific examples of the etching of a $LiTaO_3$ substrate are as follows·

149 slices (AT cut) comprising $LiTaO_3$ were ground to a 12μ finish. The samples were then immersed at 90° C, in an etching solution comprising 65 volume percent of an aqueous 49 weight percent HF solution and 35 volume percent of an aqueous 97 weight percent $H_2SO_4$ solution. The samples were maintained in the etching solution for two hours to etch the surfaces thereof, i.e., to remove surface blemishes, damages and irregularities. After about two hours and a removal of 24 microns from the surfaces thereof, the samples were removed from the etchant solution and water rinsed.

Different samples from among the 149 etched slices were then subjected to varying volume fractions of aqueous 49 weight percent HF and aqueous 97 weight percent $H_2SO_4$ solutions at varying temperatures and time intervals. An etching rate for each sample was then determined by measuring the weight change thereof and the area of each sample, using standard techniques and equipment. The rate was then calculated from this data and the density of $LiTaO_3$ [7.454 g/cm³ as reported by R. T. Smith, Applied Physics Letters, 11, 1461 (1967)] using a conventional procedure. The various experimental rates are given in Tables I to VI.

TABLE I

| | (Temperature = 25° C) | | |
|---|---|---|---|
| Volume Fraction of HF | Molality of HF (moles/1000 g. $H_2O$) | Molality of $H_2SO_4$(moles/1000 g. $H_2O$) | Etching Rate (μm/hr.) |
| 0.00 | 0.000 | 329.684 | — |
| 0.10 | 26.206 | 149.783 | — |
| 0.20 | 35.053 | 89.045 | 0.60939 |
| 0.30 | 39.498 | 58.530 | 0.04695 |
| 0.30 | 39.498 | 58.530 | 0.04695 |
| 0.35 | 40.983 | 48.336 | 0.09793 |
| 0.35 | 40.983 | 48.336 | 0.08854 |
| 0.40 | 42.172 | 40.173 | 0.12074 |
| 0.40 | 42.172 | 40.173 | 0.11672 |
| 0.45 | 43.146 | 33.490 | 0.17440 |
| 0.45 | 43.146 | 33.490 | 0.16099 |
| 0.47 | 43.487 | 31.143 | 0.18782 |
| 0.47 | 43.487 | 31.143 | 0.17843 |
| 0.50 | 43.957 | 27.916 | 0.21063 |
| 0.50 | 43.957 | 27.916 | 0.23746 |
| 0.60 | 45.234 | 19.151 | 0.21465 |
| 0.60 | 45.234 | 19.151 | 0.23880 |
| 0.65 | 45.745 | 15.643 | 0.23343 |
| 0.65 | 45.745 | 15.643 | 0.22807 |
| 0.70 | 46.192 | 12.572 | 0.22404 |
| 0.70 | 46.192 | 12.572 | 0.22672 |
| 0.75 | 46.587 | 9.862 | 0.20123 |
| 0.75 | 46.587 | 9.862 | 0.19050 |
| 0.80 | 46.938 | 7.452 | 0.17440 |
| 0.80 | 46.938 | 7.452 | 0.16904 |

TABLE I-continued (Temperature = 25° C)

| Volume Fraction of HF | Molality of HF (moles/ 1000 g. $H_2O$) | Molality of $H_2SO_4$(moles/ 1000 g. $H_2O$) | Etching Rate (μm/hr.) |
|---|---|---|---|
| 0.90 | 47.535 | 3.354 | 0.10732 |
| 0.90 | 47.535 | 3.354 | 0.10598 |
| 1.00 | 48.024 | 0.000 | 0.05098 |
| 1.00 | 48.024 | 0.000 | 0.03354 |

TABLE II (Temperature = 38° C)

| Volume Fraction of HF | Etching Rate (μm/hr.) |
|---|---|
| 0.00 | 0.00671 |
| 0.00 | 0.00939 |
| 0.10 | 0.00671 |
| 0.10 | 0.00402 |
| 0.20 | 0.02817 |
| 0.20 | 0.03354 |
| 0.30 | 0.07915 |
| 0.30 | 0.13684 |
| 0.35 | 0.20123 |
| 0.35 | 0.19318 |
| 0.40 | 0.26831 |
| 0.40 | 0.29514 |
| 0.45 | 0.30856 |
| 0.45 | 0.37027 |
| 0.47 | 0.45345 |
| 0.47 | 0.40783 |
| 0.50 | 0.46150 |
| 0.60 | 0.59968 |
| 0.65 | 0.56346 |
| 0.70 | 0.59029 |
| 0.75 | 0.55004 |
| 0.75 | 0.51382 |
| 0.80 | 0.46955 |
| 0.80 | 0.34478 |
| 0.90 | 0.23343 |
| 1.00 | 0.18782 |
| 1.00 | 0.13818 |

TABLE III (Temperature = 51° C)

| Volume Fraction of HF | Etching Rate (μm/hr.) |
|---|---|
| 0.00 | 0.05366 |
| 0.10 | 0.02683 |
| 0.20 | 0.03622 |
| 0.30 | 0.36893 |
| 0.30 | 0.43467 |
| 0.35 | 0.40247 |
| 0.40 | 0.80494 |
| 0.40 | 0.81030 |
| 0.45 | 0.93104 |
| 0.47 | 1.01556 |
| 0.60 | 1.34156 |
| 0.60 | 1.51731 |
| 0.65 | 1.32815 |
| 0.65 | 1.51596 |
| 0.70 | 1.22082 |
| 0.75 | 1.37778 |
| 0.75 | 1.30131 |
| 0.80 | 1.03300 |
| 0.80 | 1.28253 |
| 0.90 | 0.63053 |
| 0.90 | 0.72713 |
| 1.00 | 0.42930 |
| 1.00 | 0.39710 |

TABLE IV (Temperature = 64° C)

| Volume Fraction of HF | Etching Rate (μm/hr.) |
|---|---|
| 0.00 | 0.07379 |
| 0.00 | 0.07513 |
| 0.10 | 0.02415 |
| 0.10 | 0.02146 |
| 0.20 | 0.13416 |
| 0.40 | 2.14650 |
| 0.45 | 2.16796 |
| 0.47 | 2.54897 |
| 0.47 | 2.62275 |
| 0.47 | 2.19479 |

TABLE IV-continued (Temperature = 64° C)

| Volume Fraction of HF | Etching Rate (μm/hr.) |
|---|---|
| 0.50 | 2.03917 |
| 0.60 | 2.95144 |
| 0.65 | 3.48806 |
| 0.70 | 3.21975 |
| 0.75 | 2.95144 |
| 0.80 | 2.68312 |
| 0.90 | 1.87819 |
| 0.90 | 1.41266 |
| 1.00 | 0.83311 |

TABLE V (Temperature = 77° C)

| Volume Fraction of HF | Etching Rate (μm/hr.) |
|---|---|
| 0.00 | 0.22807 |
| 0.10 | 0.04025 |
| 0.10 | 0.02281 |
| 0.20 | 0.18782 |
| 0.20 | 0.24551 |
| 0.30 | 1.51731 |
| 0.35 | 1.91441 |
| 0.40 | 3.08559 |
| 0.40 | 3.33110 |
| 0.45 | 3.78052 |
| 0.47 | 4.31580 |
| 0.50 | 4.65790 |
| 0.60 | 6.43950 |
| 0.60 | 6.30400 |
| 0.65 | 6.03703 |
| 0.65 | 6.17655 |
| 0.70 | 5.98336 |
| 0.70 | 6.28522 |
| 0.75 | 5.76871 |
| 0.75 | 4.77998 |
| 0.80 | 5.90287 |
| 0.90 | 4.42715 |
| 0.90 | 3.74966 |
| 1.00 | 1.74403 |
| 1.00 | 1.72122 |

TABLE VI (Temperature = 90° C)

| Volume Fraction of HF | Etching Rate (μm/hr.) |
|---|---|
| 0.0 | 0.09659 |
| 0.20 | 0.60370 |
| 0.20 | 0.35149 |
| 0.30 | 1.74403 |
| 0.30 | 1.80977 |
| 0.35 | 2.95144 |
| 0.35 | 3.28817 |
| 0.40 | 3.89053 |
| 0.40 | 5.57553 |
| 0.45 | 7.78106 |
| 0.45 | 6.89697 |
| 0.47 | 7.07003 |
| 0.50 | 8.98846 |
| 0.50 | 8.65576 |
| 0.60 | 11.40327 |
| 0.60 | 9.45667 |
| 0.65 | 12.20821 |
| 0.65 | 10.82506 |
| 0.70 | 11.13496 |
| 0.70 | 10.05500 |
| 0.75 | 11.40327 |
| 0.75 | 10.19453 |
| 0.80 | 10.46418 |
| 0.90 | 7.51274 |
| 0.90 | 7.34773 |
| 1.00 | 4.42715 |
| 1.00 | 5.08452 |
| 1.00 | 4.25007 |

Specific examples of polishing a $LiTaO_3$ substrate are as follows:

1. A lithium tantalate ($LiTaO_3$) slice (AT cut) was ground to a 12μ finish. The slice was then immersed at 90° C for 30 minutes, in an aqueous mixture comprising 65 volume percent HF (49 weight percent) and 35 volume percent $H_2SO_4$ (97 weight percent). The thus treated slice was rendered semi-opaque thereby enabling optical examination by conventional apparatus and means for gross defects therein.

2. The procedure of (1) above was repeated except that the slice was immersed in the mixture for four hours. The slice was rendered almost transparent as well as having the surfaces thereof polished.

What is claimed is:

1. A method of etching a surface of a substrate comprising $LiTaO_3$, which comprises contacting the surface with a mixture comprising HF present in an amount ranging from about 42.172 to about 47.535 molal and $H_2SO_4$ present in an amount ranging from about 40.173 to about 3.354 molal.

2. A method of treating a body comprising lithium tantalate to obtain a polished surface thereof, which comprises contacting the surface with a mixture comprising HF present in an amount ranging from about 42.172 to about 47.535 molal and $H_2SO_4$present in an amount ranging from about 40.173 to about 3.354 molal.

3. A method of optically examining a substrate comprising $LiTaO_3$ which comprises treating the substrate with a mixture comprising HF present in an amount ranging from about 42.172 molal to about 47.535 molal and $H_2SO_4$ present in an amount ranging from about 40.173 to about 3.354 molal.

4. The method as defined in claim 3 which further comprises directly examining said treated substrate with optical means.

*5. A method of etching a surface of a substrate comprising lithium tantalate, which comprises contacting the surface with a mixture comprising HF and* $H_2SO_4$.

*6. A method of treating a body comprising lithium tantalate to obtain a polished surface thereof, which comprises contacting the surface with a mixture comprising HF and* $H_2SO_4$.

*7. A method of etching a surface of a substrate comprising lithium niobate, which comprises contacting the surface with a mixture comprising HF and* $H_2SO_4$.

* * * * *